US012311602B2

(12) United States Patent
Kopschinski et al.

(10) Patent No.: US 12,311,602 B2
(45) Date of Patent: May 27, 2025

(54) POWDER SUPPLY SYSTEM, METHOD OF OPERATING A POWDER SUPPLY SYSTEM AND APPARATUS FOR PRODUCING A THREE-DIMENSIONAL WORK PIECE (71) Applicant: Nikon SLM Solutions AG, Luebeck (DE)

(72) Inventors: Daniel Kopschinski, Luebeck (DE); Karsten Huebinger, Luebeck (DE); Marcel Overberg, Luebeck (DE)

(73) Assignee: Nikon SLM Solutions AG, Luebeck (DE)

( * ) Notice: Subject to any disclaimer, the term of this patent is extended or adjusted under 35 U.S.C. 154(b) by 785 days.

(21) Appl. No.: 17/619,392

(22) PCT Filed: Jun. 25, 2020

(86) PCT No.: PCT/EP2020/067872
§ 371 (c)(1),
(2) Date: Dec. 15, 2021

(87) PCT Pub. No.: WO2020/260478
PCT Pub. Date: Dec. 30, 2020

(65) Prior Publication Data
US 2022/0355384 A1    Nov. 10, 2022

(30) Foreign Application Priority Data
Jun. 25, 2019   (DE) .................... 10 2019 117 012.5

(51) Int. Cl.
*B22F 12/57*    (2021.01)
*B22F 10/80*    (2021.01)
(Continued)

(52) U.S. Cl.
CPC ............ *B29C 64/343* (2017.08); *B22F 10/80* (2021.01); *B22F 12/50* (2021.01); *B22F 12/57* (2021.01);
(Continued)

(58) Field of Classification Search
CPC ......... B33Y 40/00; B33Y 50/02; B33Y 10/00; B33Y 50/00; B33Y 30/00; B65G 53/06;
(Continued)

(56) References Cited

U.S. PATENT DOCUMENTS

2005/0022483 A1    2/2005  Shutic et al.
2010/0183994 A1*   7/2010  Mahieu ................... F27B 13/14
                                                          432/1
(Continued)

FOREIGN PATENT DOCUMENTS

DE    102016122838    5/2018
EP       1700686      9/2006
(Continued)

OTHER PUBLICATIONS

Search Report for German Patent Application No. 10 2019 117 012.5, German Patent and Trademark Office, Mar. 3, 2020.
(Continued)

*Primary Examiner* — Dana Ross
*Assistant Examiner* — Kuangyue Chen
(74) *Attorney, Agent, or Firm* — Williams Mullen; Thomas F. Bergert, Esq (57) ABSTRACT The invention is directed to a powder supply system (1) for use in an apparatus (100) for producing a three-dimensional work piece by irradiating layers of a raw material powder (4) with electromagnetic or particle radiation. The powder supply system (1) comprises a circuit line (7) configured to conduct a gas stream (9), a conveying device (19) configured to convey the gas stream (9) through the circuit line (7), a
(Continued)

powder doser (8) configured to introduce a desired dose of raw material powder (4) into the gas stream (9) flowing through the circuit line (7), a measuring unit (15) configured to measure at least one of a pressure and a volume flow in the circuit line (7) at a position downstream of the powder doser (8), and a control unit (40) configured to control the powder doser (8) based on at least one of a pressure value and a volume flow value measured by the measuring unit (15) in such a manner that the at least one of the pressure value and the volume flow value measured by the measuring unit (15) is within a predetermined range.

18 Claims, 3 Drawing Sheets

(51) Int. Cl.
    *B22F 12/50*      (2021.01)
    *B29C 64/343*      (2017.01)
    *B29C 64/386*      (2017.01)
    *B33Y 10/00*      (2015.01)
    *B33Y 40/00*      (2020.01)
    *B33Y 50/00*      (2015.01)
    *B65G 53/06*      (2006.01)
    *B65G 53/60*      (2006.01)
    *B65G 53/66*      (2006.01)

(52) U.S. Cl.
    CPC ............ *B29C 64/386* (2017.08); *B33Y 10/00* (2014.12); *B33Y 40/00* (2014.12); *B33Y 50/00* (2014.12); *B65G 53/06* (2013.01); *B65G 53/60* (2013.01); *B65G 53/66* (2013.01)

(58) Field of Classification Search
    CPC ......... B65G 53/66; B65G 53/60; B22F 10/80; B22F 12/50; B22F 12/57; B22F 2999/00; B22F 12/70; B22F 10/30; B29C 64/343; B29C 64/307; B29C 64/386; B29C 64/165; B29C 64/153; Y02P 10/25
    See application file for complete search history.

(56) References Cited

U.S. PATENT DOCUMENTS

| | | |
|---|---|---|
| 2014/0366515 A1 | 12/2014 | Kowalkowski et al. |
| 2016/0201572 A1 | 7/2016 | Clauson et al. |
| 2018/0185915 A1* | 7/2018 | Beauchamp ............ B22F 12/90 |

FOREIGN PATENT DOCUMENTS

| | | | |
|---|---|---|---|
| EP | 1707342 | 10/2006 | |
| EP | 2992986 | 3/2016 | |
| EP | 3023227 | 5/2016 | |
| EP | 3473360 | 4/2019 | |
| EP | 3539695 | 9/2019 | |
| FR | 3071745 | 4/2019 | |
| WO | 2019094033 | 5/2019 | |
| WO | 20190081894 | 5/2019 | |
| WO | WO-2019094033 A1 * | 5/2019 | ........... B29C 64/321 |

OTHER PUBLICATIONS

International Search Report and Written Opinion for PCT/EP2020/067872, European Patent Office, Jul. 29, 2020.

Japanese Patent Office, Office Action for JP Patent Application No. 2021-576154, Sep. 27, 2022.

China National Intellectual Property Administration, First Office Action for CN202080053056.7, Sep. 29, 2022.

China National Intellectual Property Administration, Second Office Action for CN 202080053056.7, May 31, 2023.

\* cited by examiner

POWDER SUPPLY SYSTEM, METHOD OF OPERATING A POWDER SUPPLY SYSTEM AND APPARATUS FOR PRODUCING A THREE-DIMENSIONAL WORK PIECE

CROSS-REFERENCES TO RELATED APPLICATIONS

This application is based on international patent application PCT/EP 2020/067872 and claims the benefit of the German patent application No. 10 2019 117 012.5 filed on Jun. 25, 2019, the entire disclosures of which are incorporated herein by way of reference.

FIELD OF THE INVENTION

The invention is directed to a powder supply system for use in an apparatus for producing a three-dimensional work piece by irradiating layers of a raw material powder with electromagnetic or particle radiation and to a method of operating a powder supply system of this kind. Further, the invention is directed to an apparatus for producing a three-dimensional work piece by irradiating layers of a raw material powder with electromagnetic or particle radiation.

BACKGROUND OF THE INVENTION

Powder bed fusion is an additive layering process by which pulverulent, in particular metallic and/or ceramic raw materials can be processed to three-dimensional work pieces of complex shapes. To that end, a raw material powder layer is applied onto a carrier and subjected to laser radiation in a site selective manner in dependence on the desired geometry of the work piece that is to be produced. The laser radiation penetrating into the powder layer causes heating and consequently melting or sintering of the raw material powder particles. Further raw material powder layers are then applied successively to the layer on the carrier that has already been subjected to laser treatment, until the work piece has the desired shape and size. The same procedure can also be used in order to repair a given work piece, for example a workpiece with a missing section. In this case, the powder may only be applied to and subjected to the laser radiation at the missing section. Powder bed fusion may be employed for the production or repairing of prototypes, tools, replacement parts, high value components or medical prostheses, such as, for example, dental or orthopaedic prostheses, on the basis of CAD data.

An exemplary apparatus for producing three-dimensional work pieces by powder bed fusion as described in EP 3 023 227 B1 comprises a process chamber accommodating a powder application device for successively applying layers of a raw material powder onto a carrier. An irradiation unit is provided for selectively irradiating a laser beam across the raw material powder layers. The raw material powder is supplied to the process chamber via a powder inlet.

SUMMARY OF THE INVENTION

It is an object of the present invention to provide a powder supply system which allows a reliable control of the supply of a raw material powder to a process chamber of an apparatus for producing a three-dimensional work piece by irradiating layers of a raw material powder with electromagnetic or particle radiation. It is also an object of the present invention to provide a method of operating a powder supply system of this kind and an apparatus for producing a three-dimensional work piece by irradiating layers of a raw material powder with electromagnetic or particle radiation which is equipped with a powder supply system of this kind.

A powder supply system for use in an apparatus for producing a three-dimensional work piece by irradiating layers of a raw material powder with electromagnetic or particle radiation comprises a circuit line configured to conduct a gas stream. The gas flowing through the circuit line may be air, nitrogen, an inert gas or a composition of inert gases. The circuit line may comprise straight tubes, bent tubes, valves, hoses etc. The circuit line may form a closed circuit. The circuit line may have a predetermined fluidic resistance. Further, the powder supply system comprises a conveying device configured to convey the gas stream through the circuit line.

The powder supply system further comprises a powder doser configured to introduce a desired dose of raw material powder into the gas stream flowing through the circuit line. The raw material powder may comprise a metal powder, a metal alloy powder, a ceramic powder and/or a plastic material (such as a polymer or else) powder. The raw material powder may have any suitable particle size or particle size distribution. The powder doser may comprise a dosage opening which is connected to the circuit line. Further, the powder doser may comprise a first powder valve which is suitable to open or close the dosage opening in order to enable or block the introduction of raw material powder into the circuit line, i.e. the gas stream flowing through the circuit line. Preferably, the first powder valve is provided with a continuously variable flow cross-section such that the amount of powder introduced into the gas stream flowing through the circuit line via the dosage opening can be continuously varied.

The powder supply system further comprises a measuring unit. The measuring unit is configured to measure at least one of a pressure and a volume flow in the circuit line at a position downstream of the powder doser. The measuring unit may be configured to measure exclusively the pressure in the circuit line at a position downstream of the powder doser. Alternatively, the measuring unit may be configured to measure exclusively the volume flow in the circuit line at a position downstream of the powder doser. It is, however, also conceivable that the measuring unit is configured to measure both the pressure and the volume flow in the circuit line downstream of the powder doser. In the context of this application, the expressions "downstream" and "upstream" refer to the flow direction of the gas stream through the circuit line.

The powder supply system also comprises a control unit configured to control the powder doser based on at least one of a pressure value and a volume flow value measured by the measuring unit. The control unit may comprise a computer, a data storage unit and a program storage medium. The measuring unit is, for example, configured to generate a first measuring signal based on the measured pressure value and/or the measured volume flow value and to output the signal to the control unit. In this case, the control unit may be configured to control the powder doser based on the measured pressure value and/or the measured volume flow value which the control unit may derive from the first measuring signal.

The fluidic resistance of the circuit line and the components arranged therein, which is to be overcome when a gas/raw material powder mixture stream is conveyed through the circuit line, varies in dependence on the load, i.e. the amount of raw material powder particles present in the gas/raw material powder mixture stream. Thus, in case the delivery rate of the conveying device is kept constant, the pressure value and/or the volume flow value measured by the measuring unit vary/varies in dependence on the amount of powder which is introduced into the gas stream per time by means of the powder doser.

Specifically, in case a negative pressure, i.e. a pressure below atmospheric pressure is established in the circuit line during operation of the conveying device, the absolute pressure value measured by the measuring unit decreases (due to the increased power of the conveying device) in case the powder load in the gas stream increases.

Further, the increase of the power of the conveying device due to an increase of the powder load in the gas stream results in an increase of the volume flow value measured by the measuring unit. To the contrary, the pressure value measured by the measuring unit increases (due to the reduced power of the conveying device) in case the powder load in the gas stream decreases. Further, the decrease of the power of the conveying device due to a decrease of the powder load in the gas stream results in a decrease of the volume flow value measured by the measuring unit. In other words, the negative pressure increases (assumes lower absolute pressure values) and the volume flow also increases in case the powder load in the gas stream increases, whereas the negative pressure decreases (assumes higher absolute pressure values) and also the volume flow decreases in case the powder load in the gas stream decreases.

In the powder supply system described herein, the conveying device thus may be operated with a preset delivery rate which may, for example, correspond to a desired volume flow of the gas stream to be conveyed through the circuit line. In particular, the power and hence the delivery rate of the conveying device may be kept constant such that a time-dependent control of the conveying device may be dispensed with. The control of the powder doser in dependence on the pressure value and/or the volume flow value measured by the measuring unit allows setting the amount of powder conveyed through the circuit line independent of operational malfunctions which lead to an absolute pressure drop, i.e. an increase of the negative pressure in the circuit line (from e.g. 500 mbar to 300 mbar), and/or a sudden volume flow increase, such as, for example, partial clogging of the conveying device or other components arranged in the circuit line. As a result, the powder supply to the process chamber of the apparatus for producing a three-dimensional work piece may be kept at a desired level and hence is particularly reliable.

For example, the control unit may be configured to control the powder doser so as to dose the raw material powder into the gas stream flowing through the circuit line in such a manner that the pressure value and/or the volume flow value measured by the measuring unit is within a predetermined range. In particular, the pressure value and/or the volume flow value may lie within predetermined pressure range and/or a predetermined volume flow range which is determined in dependence on the design and specifically the power of the conveying device. The predetermined pressure range and/or the predetermined volume flow range may be specified by a user in order to ensure that a sufficient amount of powder is supplied to the process chamber of the apparatus for producing three-dimensional work piece while, at the same time, overloading the circuit line and the components arranged therein with raw material powder is prevented.

For example, for a power supply system comprising a conveying device which is configured to generate a throughput such that the measured (absolute) pressure value lies between an atmospheric pressure (1 atm) and a pressure of 100 mbar, a predetermined pressure range may lie within 100 mbar-1 atm, for example 800-900 mbar. Depending on the design conveying device and the circuit line, the predetermined pressure range may, however, also be different, for example 600-800 mbar.

The powder supply system may further comprise a cyclone configured to separate the raw material powder introduced into the gas stream by the powder doser from the gas stream. The cyclone may be connected to or positioned in the circuit line downstream of the powder doser. The cyclone may comprise an intake which allows a tangential injection of the gas/raw material powder mixture into a cone-shaped separation chamber. Within the separation chamber, the rotating flow of the gas/raw material powder mixture may be accelerated such that centrifugal forces press the raw material powder particles against inner walls of the separation chamber. As a result, the powder particles are decelerated and drop out of the rotating flow driven by gravity. The powder particles may be discharged from the cyclone via a powder outlet arranged in the region of a lower part of the cyclone. The gas separated from the powder particles, however, may be directed back into the circuit line via a gas outlet of the cyclone which may be arranged in an upper part of the cyclone.

The cyclone may further be configured to supply the raw material powder to a process chamber of the apparatus for producing a three-dimensional work piece. For example, the powder outlet of the cyclone may be connected to a powder inlet of the process chamber which in turn may be connected to a powder application device configured to apply the raw material powder onto a carrier accommodated within the process chamber. In order to dose the raw material powder supplied from the cyclone to the process chamber, a second powder valve may be provided in a connecting line connecting the powder outlet of the cyclone to the powder inlet of the process chamber. Preferably, the second powder valve is provided with a continuously variable flow cross-section such that the amount of powder supplied to the process chamber can be continuously varied.

The measuring unit may be configured to measure the at least one of the pressure and the volume flow in the circuit line at a position downstream of the cyclone. The measuring unit then may be operated to measure the pressure and/or the volume flow of the gas which has been separated from the raw material powder by means of the cyclone.

In one example, the control unit is configured to control the powder doser so as to increase the dose of raw material powder introduced into the gas stream flowing through the circuit line until the at least one of the pressure value and a volume flow value measured by the measuring unit reaches a predetermined threshold. The predetermined threshold may be a pressure value which corresponds to an optimum mass flow of raw material powder through the circuit line. Specifically, the predetermined threshold may correspond to a lower limit of the predetermined pressure range. The predetermined threshold may, however, also be a volume flow value which corresponds to an optimum mass flow of raw material powder through the circuit line and may correspond to an upper limit of the predetermined volume flow range.

The control unit may be configured to control the powder doser so as to dose the raw material powder introduced into the gas stream flowing through the circuit line in such a manner that, after reaching the predetermined threshold, the at least one of the pressure value and the volume flow value measured by the measuring unit is/are maintained substantially constant. Specifically, the powder doser may be controlled by the control unit in such a manner that, after reaching a steady operational state of the powder supply system, an optimum mass flow of raw material powder through the circuit line is maintained. In case an optimum mass flow of raw material powder flows through the circuit line, a high mass flow of powder and hence a high efficiency of the powder supply system is achieved. At the same time, clogging of the circuit line and/or the components arranged in the circuit line still is prevented. The optimum mass flow of raw material powder through the circuit line thus is the maximum mass flow that may be achieved while still omitting clogging of the circuit line and/or the components arranged in the circuit line.

For example, the control unit may be configured to control the powder doser so as to introduce no powder into the gas stream flowing through the circuit line at a first point in time and to store the at least one of the pressure value and the volume flow value measured by the measuring unit at the first point in time as at least one of a reference pressure value and a reference volume flow value. The pressure value measured at the first point in time which is stored as a reference pressure value depends on the power, i.e. the delivery rate of the conveying device. Similarly, also the volume flow value measured at the first point in time which is stored as a reference volume flow value depends on the power, i.e. the delivery rate of the conveying device. Thus, different reference pressure values and/or reference volume flow values may be determined for different delivery rates of the conveying device. Therefore, the reference pressure value and/or the reference volume flow value may be stored in association with the corresponding power or delivery rate of the conveying device. For example, the control unit may be configured to store the reference pressure value and/or the reference volume flow value in a storage unit comprised in the control unit. The reference pressure value and/or the reference volume flow value is associated with a fluidic resistance of the circuit line, for example a fluidic resistance of the circuit line and the components arranged therein when no powder is being introduced into the gas stream flowing through the circuit line.

The control unit may also be configured to control the powder doser so as to introduce no powder into the gas stream flowing through the circuit line at a second point in time later than the first point in time. The control unit may be configured to store the pressure value measured by the measuring unit at the second point in time as a comparison pressure value. Similarly, the control unit may be configured to store the volume flow value measured by the measuring unit at the second point in time as a comparison volume flow value. Like the reference pressure value and/or the reference volume flow value, also the comparison pressure value and/or the comparison volume flow value depend(s) on the power, i.e. the delivery rate of the conveying device. Thus, different comparison pressure values and/or comparison volume flow values may be determined for different delivery rates of the conveying device. Therefore, the comparison pressure value and/or the comparison volume flow value may be stored in association with the corresponding power or delivery rate of the conveying device.

The control unit may also be configured to compare the at least one of the pressure value and the volume flow value measured by the measuring unit at the second point in time, i.e. the comparison pressure value and/or the comparison volume flow value with the corresponding one of the at least one of the reference pressure value and the reference volume flow value. Preferably, a reference pressure value and a comparison pressure value which are determined while the delivery rate of the conveying device is kept constant are compared. Similarly, a reference volume flow value and a comparison volume flow value which are determined while the delivery rate of the conveying device is kept constant maybe compared.

This enables a comparison of the fluidic resistance of the circuit line and the components arranged therein at the first point in time with the fluidic resistance of the circuit line and the components arranged therein at the second point in time. In case the comparison results in a low pressure difference and/or a low volume flow difference, the fluidic resistance of the circuit line and the components arranged therein has not changed much between the first point in time and the second point in time. This indicates proper functioning of the overall system. To the contrary, in case the comparison results in a high pressure difference and/or a high volume flow difference, this may indicate that there is a malfunction within the system. For example, components arranged in the circuit line may be clogged or defect at the second point in time, resulting in an increased fluidic resistance. In case a filter is arranged in the circuit line, a high pressure difference and/or a high volume flow difference may indicate clogging of the filter and may be used as a trigger for cleaning the filter.

The control unit may be configured to tolerate a certain deviation of the comparison pressure value from the reference pressure value and/or a certain deviation of the comparison volume flow value from the reference volume flow value. Preferably, however, the control unit is configured to output a warning signal in case a difference between the pressure value measured by the measuring unit at the second point in time and the reference pressure value exceeds a predetermined threshold. Similarly, the control unit may be configured to output a warning signal in case a difference between the volume flow value measured by the measuring unit at the second point in time and the reference volume flow value exceeds a predetermined threshold. The warning signal output by the control unit may be a visual signal or an audio signal. It is, however, also conceivable that the control unit automatically interrupts the operation of the powder supply system in case the difference between the comparison pressure value and the reference pressure value and/or the difference between the comparison volume flow value and the reference volume flow value exceed(s) the predetermined threshold.

The pressure difference obtained by comparing the comparison pressure value with the reference pressure value may be associated with a particular event. Similarly, the volume flow difference obtained by comparing the comparison volume flow value with the reference volume flow value may be associated with a particular event. For example, different pressure differences and/or different volume flow differences may be associated with different events. A first pressure difference and/or a first volume flow difference may be associated with a clogged filter. A second pressure difference and/or a second volume flow difference may be associated with a rupture in a tube.

A third pressure difference and/or a third volume flow difference may be associated with a malfunction of the cyclone. The control unit may be configured to output a signal associated with an event depending on the pressure difference obtained by comparing the comparison pressure value with the reference pressure value. Similarly, the control unit may be configured to output a signal associated with an event depending on the volume flow difference obtained by comparing the comparison volume flow value with the reference volume flow value.

It is also conceivable that the control unit is configured to control the powder doser so as to introduce no powder into the gas stream flowing through the circuit line at one or more third point(s) in time later than the second point in time. The control unit may be configured to store the at least one of the pressure value and a volume flow value measured by the measuring unit at the third point(s) in time as at least one further comparison pressure value and/or at least one further comparison volume flow value. The control unit may further be configured to compare the pressure value(s) measured by the measuring unit at the third point(s) in time with the reference pressure value and/or a pressure value measured at an earlier point in time, for example the second point in time or an earlier third point in time. Similarly, the control unit may be configured to compare the volume flow value(s) measured by the measuring unit at the third point(s) in time with the reference volume flow value and/or a volume flow value measured at an earlier point in time, for example the second point in time or an earlier third point in time. This enables a tracking of the fluidic resistance over time. The time-dependent change of the fluidic resistance may also be associated with one or more events.

As already mentioned above, the pressure difference obtained by comparing the reference pressure value with the comparison pressure value and/or at least one further comparison pressure value and/or the pressure difference obtained by comparing at least one further comparison pressure value with the comparison pressure value or a further comparison pressure value measured at an earlier point in time may be used as an indication for the proper functioning or a malfunctioning of the powder supply system and/or as a trigger for specific maintenance processes, for example cleaning of a filter arranged in the circuit line. The control unit may, however, also be configured to adjust the predetermined pressure range and/or the predetermined threshold of the pressure value measured by the measuring unit. For example, in case the pressure value measured at the second point in time is 100 mbar lower than the pressure value measured at the first point in time, the predetermined threshold and/or the predetermined range may be increased by 90 mbar.

This may compensate for the observed change of the fluidic resistance, while still maintaining the desired supply of raw material powder into the process chamber of the apparatus for producing a three-dimensional work piece.

Similarly, also the volume flow difference obtained by comparing the reference volume flow value with the comparison volume flow value and/or at least one further comparison volume flow value and/or the volume flow difference obtained by comparing at least one further comparison volume flow value with the comparison volume flow value or a further comparison volume flow value measured at an earlier point in time may be used as an indication for the proper functioning or a malfunctioning of the powder supply system and/or as a trigger for specific maintenance processes, for example cleaning of a filter arranged in the circuit line. The control unit may, however, also be configured to adjust the predetermined volume flow range and/or the predetermined threshold of the volume flow value measured by the measuring unit.

The conveying device may be designed in the form of a vacuum pump. Further, the conveying device may be connected to the circuit line at a position upstream of the powder doser. Additionally or alternatively thereto, the conveying device may be connected to the circuit line at a position downstream of the measuring unit. In particular, the conveying device, in the flow direction of the gas stream through the circuit line, may be positioned between the measuring unit and the powder doser.

In one example, the powder supply system further comprises a filter unit configured to filter raw material powder particles from the gas stream flowing through the circuit line. Preferably, the filter unit is connected to the circuit line upstream of the measuring unit. Additionally or alternatively thereto, the filter unit may be connected to the circuit line at a position downstream of the cyclone. The filter unit may comprise a filter configured to filter residual raw material powder particles which still float in the gas stream exiting the gas outlet of the cyclone from the gas stream. The filter may be a replaceable filter. The filter unit ensures that the measuring unit and the conveying device are supplied with a clean gas stream in which the powder load is kept as low as possible. As a result, malfunctioning of the measuring unit and damage to the conveying device may be prevented.

The powder supply system may further comprise at least one further measuring unit configured to measure at least one of the pressure and the volume flow in the circuit line. In particular, a further measuring unit may be configured to measure at least one of the pressure and the volume flow in the circuit line at a position upstream of the filter unit, upstream of the cyclone or upstream of the powder doser. It is, however, also conceivable that the powder supply system is provided with a plurality of further measuring units which are arranged at different positions in the circuit line, for example upstream of the filter unit, upstream of the cyclone and/or upstream of the powder doser.

The control unit may be configured to control the powder doser based on the at least one further pressure value measured by the at least one further measuring unit. For example, the control unit may be configured to control the powder doser based on both the pressure value measured by the measuring unit and the at least one further pressure value measured by the at least one further measuring unit in order to compensate for pressure variations within the circuit line.

Alternatively or additionally thereto, the control unit may be configured to compare the at least one further pressure value measured by the at least one further measuring unit with the pressure value measured by the measuring unit and/or to compare a plurality of further pressure values measured by a plurality of further measuring units with each other. A comparison of the pressure value measured by the measuring unit with one or more further pressure value(s) measured by one or more further measuring unit(s) allows a localization of a pressure variation, in particular a localization of a pressure drop within the circuit line. Thus, the comparison of the pressure value measured by the measuring unit with one or more further pressure value(s) measured by one or more further measuring unit(s) may be used to localize a malfunctioning component of the powder supply system.

The control unit may be configured to indicate a location of a malfunctioning component of the powder supply system based on the comparison of the at least one further pressure value measured by the at least one further measuring unit with the pressure value measured by the measuring unit. For indicating a location of a malfunctioning component of the powder supply system, the control unit may also rely on a comparison of a plurality of further pressure values measured by a plurality of further measuring units with each other. For example, the control unit may be configured to output respective signals indicating a malfunctioning, in particular a clogging of the conveying device, the filter unit or any other component of the powder supply system.

The control unit may also be configured to control the powder doser based on the at least one further volume flow value measured by the at least one further measuring unit. For example, the control unit may be configured to control the powder doser based on both the volume flow value measured by the measuring unit and the at least one further volume flow value measured by the at least one further measuring unit in order to compensate for volume flow variations within the circuit line.

Alternatively or additionally thereto, the control unit may be configured to compare the at least one further volume flow value measured by the at least one further measuring unit with the volume flow value measured by the measuring unit and/or to compare a plurality of further volume flow values measured by a plurality of further measuring units with each other. A comparison of the volume flow value measured by the measuring unit with one or more further volume flow value(s) measured by one or more further measuring unit(s) allows a localization of a volume flow variation, in particular a localization of a sudden volume flow increase within the circuit line. Thus, the comparison of the volume flow value measured by the measuring unit with one or more further volume flow value(s) measured by one or more further measuring unit(s) may be used to localize a malfunctioning component of the powder supply system.

The control unit may be configured to indicate a location of a malfunctioning component of the powder supply system based on the comparison of the at least one further volume flow value measured by the at least one further measuring unit with the volume flow value measured by the measuring unit. For indicating a location of a malfunctioning component of the powder supply system, the control unit may also rely on a comparison of a plurality of further volume flow values measured by a plurality of further measuring units with each other.

The measuring unit may comprise at least one of a pressure sensor and a flow velocity sensor. Alternatively or additionally to the flow velocity sensor, also a volume flow sensor may be employed. Specifically in case the measuring unit is supplied with clean gas, the pressure sensor may be designed in the form of a gas pressure sensor. Similarly, the flow velocity sensor may be designed in the form of a gas flow velocity sensor and/or the volume flow sensor may be designed in the form of a gas volume flow sensor. In a particular preferred embodiment, the flow velocity sensor may be designed in the form of the heat wire anemometer.

The at least one further measuring unit may also comprise at least one of a pressure sensor and a flow velocity sensor. Again, alternatively or additionally to the flow velocity sensor, a volume flow sensor may be employed. In case the further measuring unit is supplied with clean gas, the pressure sensor may be designed in the form of a gas pressure sensor, the flow velocity sensor may be designed in the form of a gas flow velocity sensor and/or the volume flow sensor may be designed in the form of a gas volume flow sensor. However, in case the further measuring unit is supplied with gas containing powder particles, the pressure sensor, the flow velocity sensor and/or the volume flow sensor should be configured to measure the pressure, the flow velocity and/or the volume flow of gas/particle mixture flowing through the circuit line at the position of the further measuring unit.

A method of operating a powder supply system for use in an apparatus for producing a three-dimensional work piece by irradiating layers of a raw material powder with electromagnetic or particle radiation comprises a step of conveying a gas stream through a circuit line. A desired dose of raw material powder is introduced into the gas stream flowing through the circuit line by means of a powder doser. A measuring unit measures at least one of a pressure and a volume flow in the circuit line at a position downstream of the powder doser. The dose of raw material powder introduced into the gas stream flowing through the circuit line by means of the powder doser is controlled based on at least one of a pressure value and a volume flow value measured by the measuring unit in such a manner that the at least one of the pressure value and a volume flow value measured by the measuring unit is within a predetermined range.

The raw material introduced into the gas stream by the powder doser may be separated from the gas stream by means of a cyclone. In addition, the cyclone may supply the raw material powder to a process chamber of the apparatus for producing a three-dimensional work piece. The measuring unit may measure the at least one of the pressure and a volume flow in the circuit line at a position downstream of the powder doser Alternatively or additionally thereto, the dose of raw material powder introduced into the gas stream flowing through the circuit line may be increased until at least one of the pressure value and a volume flow value measured by the measuring unit reaches a predetermined threshold. It is further conceivable that the dose of raw material powder introduced into the gas stream flowing through the circuit line is controlled in such a manner that, after reaching the predetermined threshold, the at least one of pressure value measured and the volume flow value by the measuring unit is/are maintained substantially constant.

The step of controlling the dose of raw material powder introduced into the gas stream flowing through the circuit line may comprise introducing no powder into the gas stream flowing through the circuit line at a first point in time and storing the at least one of the pressure value and the volume flow value measured by the measuring unit at the first point in time as at least one of a reference pressure value and a reference volume flow value. Further, it is conceivable that the step of controlling the dose of raw material powder introduced into the gas stream flowing through the circuit line comprises introducing no powder into the gas stream flowing through the circuit line at a second point in time later than the first point in time and in particular storing the at least one of the pressure value and the volume flow value measured at the second point in time as at least one of a comparison pressure value and a comparison volume flow value.

The pressure value measured by the measuring unit at the second point in time, i.e. the comparison pressure value, may be compared with the reference pressure value. Alternatively or additionally thereto, the volume flow value measured by the measuring unit at the second point in time, i.e. the comparison volume flow value, may be compared with the reference volume flow value. A warning signal may be output in case a difference between the pressure value measured by the measuring unit at the second point in time and the reference pressure value exceeds a predetermined threshold. A warning signal may also be output in case a difference between the volume flow value measured by the measuring unit at the second point in time and the reference volume flow value exceeds a predetermined threshold.

The gas stream which at least along a part of the length of the circuit line is loaded with raw material powder particles may be conveyed through the circuit line by means of a conveying device which is designed in the form of a vacuum pump and/or which is connected to the circuit line at a position upstream of the powder doser powder doser and/or downstream of the measuring unit. Raw material powder particles may be filtered from the gas stream flowing through the circuit line by means of a filter unit which may be connected to the circuit line upstream of the measuring unit and/or downstream of the cyclone.

The method of operating a powder supply system may further comprise measuring at least one of the pressure and the volume flow in the circuit line at at least one further position by means of at least one further measuring unit. The at least one further position may be a position upstream of the filter unit, a position upstream of the cyclone and/or a position upstream of the powder doser.

The method may further comprise the step of controlling the dose of raw material powder introduced into the gas stream flowing through the circuit line by means of the powder doser based on at least one further pressure value measured by the at least one further measuring unit. The at least one further pressure value measured by the at least one further measuring unit may be compared with the pressure value measured by the measuring unit. It is, however, also conceivable that a plurality of further pressure values measured by a plurality of further measuring units are compared to each other. A location of a malfunctioning component of the powder supply system may be indicated based on the comparison of the at least one further pressure value measured by the at least one further measuring unit with the pressure value measured by the measuring unit and/or based on the comparison of a plurality of further pressure values measured by a plurality of further measuring units with each other.

The method may also comprise the step of controlling the dose of raw material powder introduced into the gas stream flowing through the circuit line by means of the powder doser based on at least one further volume flow value measured by the at least one further measuring unit. The at least one further volume flow value measured by the at least one further measuring unit may be compared with the volume flow value measured by the measuring unit. It is, however, also conceivable that a plurality of further volume flow values measured by a plurality of further measuring units are compared to each other. A location of a malfunctioning component of the powder supply system may be indicated based on the comparison of the at least one further volume flow value measured by the at least one further measuring unit with the volume flow value measured by the measuring unit and/or based on the comparison of a plurality of further volume flow values measured by a plurality of further measuring units with each other.

An apparatus for producing a three-dimensional work piece by irradiating layers of a raw material powder with electromagnetic or particle radiation comprises a powder supply system as described above. The apparatus may further comprise a process chamber which is supplied with raw material powder from the cyclone of the powder supply system. A powder application device may be disposed in the process chamber and may serve to apply a raw material powder onto a carrier. The apparatus may further comprise an irradiation system for selectively irradiating a radiation beam, in particular a laser beam, onto the raw material powder applied onto the carrier.

BRIEF DESCRIPTION OF THE DRAWINGS

Preferred embodiments of the invention will be described in greater detail with reference to the appended schematic drawings, wherein.

DETAILED DESCRIPTION OF PREFERRED EMBODIMENTS

Figure 1:
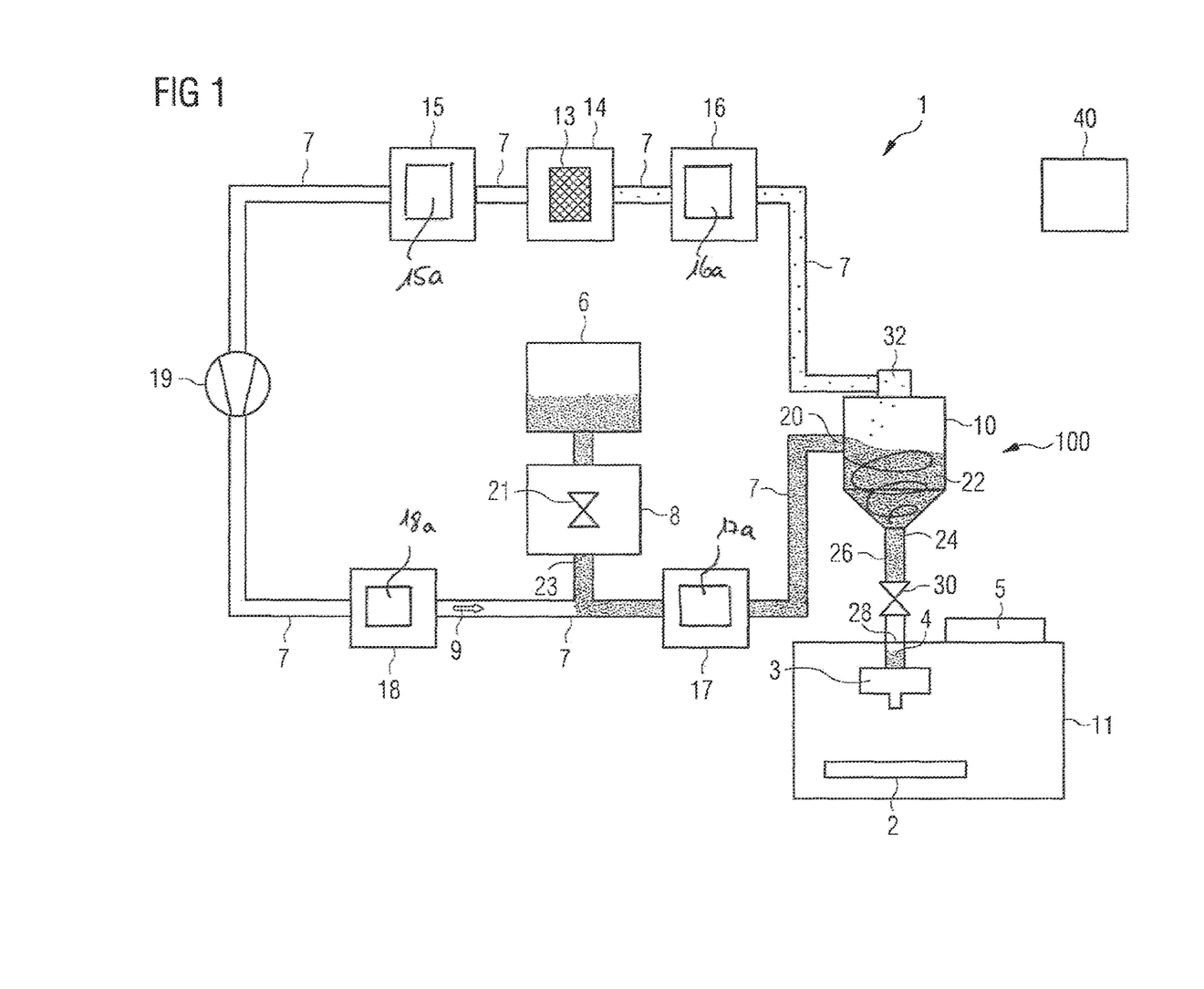
FIG. 1 shows an apparatus for producing a three-dimensional work piece by irradiating layers of a raw material powder with electromagnetic or particle radiation which is equipped with a powder supply system.
Figure 2:
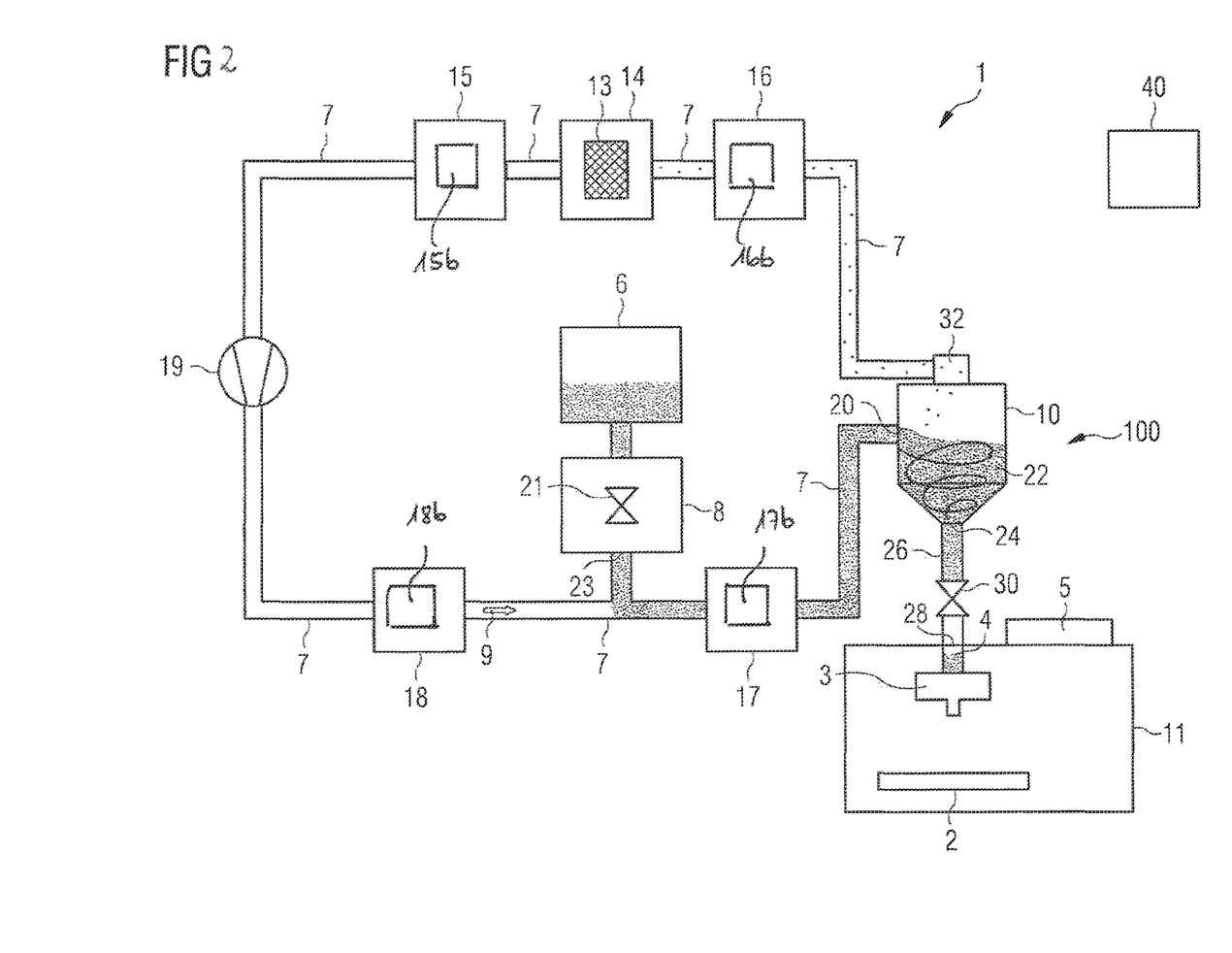
FIG. 2 shows an apparatus for producing a three-dimensional work piece by irradiating layers of a raw material powder with electromagnetic or particle radiation which is equipped with an alternative powder supply system.

FIGS. 1 and 2 show an apparatus 100 for producing a three-dimensional work piece by an additive layering process. The apparatus comprises a carrier 2 and a powder application device 3 for applying a raw material powder 4 onto the carrier 2.

The carrier 2 and the powder application device are accommodated within a process chamber 11 which is sealable against the ambient atmosphere, i.e. the environment surrounding the process chamber 11. The apparatus 100 further comprises an irradiation device 5 for selectively irradiating electromagnetic or particle radiation onto the raw material powder 4 applied onto the carrier 2.

The process chamber 11, i.e. the powder application device 3 is supplied with raw material powder 4 by means of a powder supply system 1 which is described in greater detail below. The powder supply system 1 comprises a powder storage 6 in which the raw material powder 4 supplied to the process chamber 11 is stored. The powder storage 6 is connected to a circuit line 7 via a powder doser 8. The circuit line 7 conducts a gas stream 9 which is conveyed through the circuit line 7 in a direction indicated by the arrow in FIG. 1 by means of a conveying device 19. In exemplary powder supply system 1 shown in FIG. 1, the conveying device 19 is designed in the form of a vacuum pump. The powder doser 8 is configured to introduce a desired dose of raw material powder 4 into the gas stream 9 flowing through the circuit line 7. In particular, the powder doser 8 comprises a first powder valve 21 which is provided with a continuously variable flow cross-section such that the amount of powder 4 introduced into the gas stream 9 flowing through the circuit line 7 via a dosage opening 23 of the powder doser 8 can be continuously varied. The first powder valve 21 may also be designed in the form of a spindle.

The raw material powder/gas mixture flowing through the circuit line 7 downstream of the powder doser 8 is conveyed to a cyclone 10. The cyclone 10 comprises an intake 20 which allows a tangential injection of the gas/raw material powder mixture into a cone-shaped separation chamber 22. Powder particles 4 which drop out of the rotating current of the gas/raw material powder mixture which is established within the cone-shaped separation chamber 22 are discharged from the cyclone 10 via a powder outlet 24 arranged in the region of a lower part of the cyclone 10. These powder particles 4 are supplied to the process chamber 11, i.e. the powder application device 3, via a connecting line 26 connecting the powder outlet 24 of the cyclone 10 to a powder inlet 28 of the process chamber 11. A second powder valve 30 is arranged in the connecting line 26. Like the first powder valve 21 of the powder doser 8, also the second powder valve 30 is provided with a continuously variable flow cross-section such that the amount of powder 4 supplied to the process chamber 11 from the powder outlet 24 of the cyclone 10 can be continuously varied. The second powder valve 30 may also be designed in the form of a spindle. The gas separated from the powder particles 4 in the cyclone 10 is directed back into the circuit line 7 via a gas outlet 32 of the cyclone 10 which is arranged in an upper part of the cyclone 10.

Since the gas stream 9 exiting the gas outlet 32 of the cyclone 10 may contain residual raw material powder particles 4, a filter unit 14 is arranged in the circuit line 7 downstream of the cyclone 10. The filter unit 14 comprises a replaceable filter 13 configured to filter the residual raw material powder particles 4 which float in the gas stream 9 exiting the gas outlet 32 of the cyclone 10 from the gas stream 32.

The powder supply system 1 further comprises a measuring unit 15 which is configured to measure at least one of a pressure and a volume flow in the circuit line 7 at a position downstream of the cyclone 10. The measuring unit 15 is arranged in the circuit line 7 downstream of the filter unit 14 such that measuring unit 15 is supplied with a clean gas stream 9 in which the powder load is kept as low as possible. The conveying device 19 is arranged in the circuit line 7 downstream of the measuring unit 15 and hence also downstream of the filter unit 14. Consequently, also the conveying device 19 is supplied with a clean gas stream 9. Disturbances of the measurements performed by the measuring unit 15 by residual powder particles 4 in the gas stream 9 and/or clogging of the conveying device 19 thus are reliably prevented.

The powder supply system 1 is also provided with a plurality of further measuring units 16, 17, 18 which are arranged in the circuit line 7 at different positions. In particular, the further measuring unit 16, 17, 18 are configured to measure at least one of the pressure and the volume flow in the circuit line 17 at a position upstream of the filter unit 14, upstream of the cyclone 10 and upstream of the powder doser 18.

Finally, the powder supply system 1 comprises a control unit 40. The control unit 40 controls the operation of the powder doser 8 and hence the amount of raw material powder 4 introduced the gas stream 9 by means of the powder doser 8. In addition, the control unit 40 serves to control the operation of the conveying device 19.

In the arrangement of FIG. 1, the measuring unit 15 of the powder supply system 1 is equipped with a pressure sensor 15a. Since the measuring unit 15 is supplied with clean gas 9, the pressure sensor 15a is designed in the form of a gas pressure sensor. The further measuring units 16, 17, 18 are equipped with pressure sensors 16a, 17a, 18a. The pressure sensor 18a arranged in the further measuring unit 18 which is supplied with clean gas 9 also is designed in the form of a gas pressure sensor. To the contrary, the pressure sensors 16a, 17a arranged in the further measuring units 16, 17 are configured to detect the pressure of a gas/powder particle mixture.

To the contrary, in the arrangement of FIG. 2, the measuring unit 15 of the powder supply system 1 is equipped with a flow velocity sensor 15b. Since the measuring unit 15 is supplied with clean gas 9, the flow velocity sensor 15b is designed in the form of a gas flow velocity sensor. The further measuring units 16, 17, 18 are equipped with flow velocity sensors 16b, 17b, 18b. The flow velocity sensor 18b arranged in the further measuring unit 18 which is supplied with clean gas 9 also is designed in the form of a gas flow velocity sensor. To the contrary, the flow velocity sensors 16a, 17a arranged in the further measuring units 16, 17 are configured to detect the flow velocity of a gas/powder particle mixture.

In a further embodiment of the powder supply system 1 not shown in the drawings, the measuring unit 15 may be equipped with both a pressure sensor 15a and a flow velocity sensor 15b. Similarly, also the further measuring units 16, 17, 18 may be equipped with both pressure sensors 16a, 17a, 18a and flow velocity sensors 16b, 17b, 18b.

Figure 3:
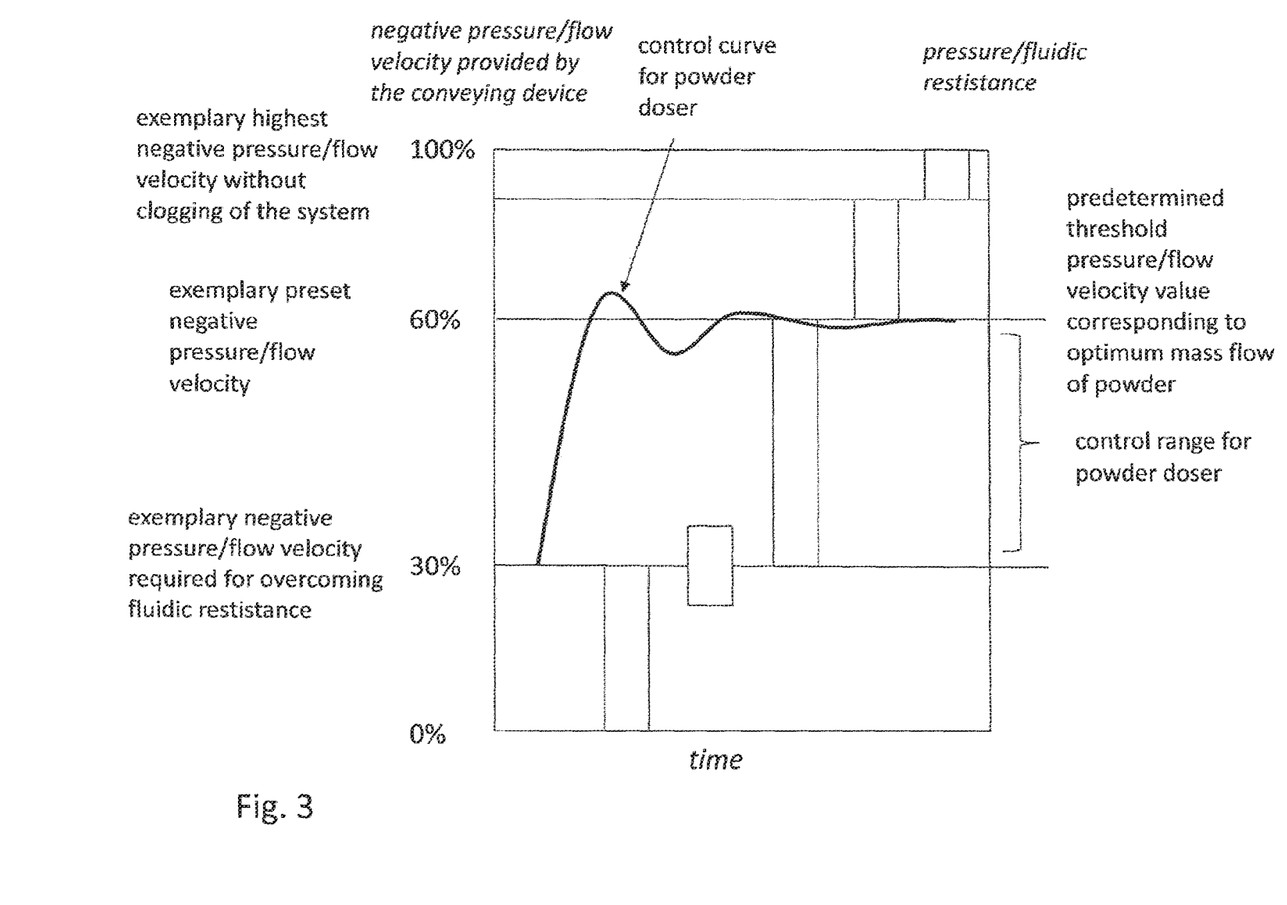
FIG. 3 shows a diagram indicating various operational ranges of a conveying device of the powder supply systems shown in FIGS. 1 and 2, a preferred control curve of a powder doser of the powder supply system shown in FIG. 1 and ranges of the fluidic resistance occurring in the circuit line the powder supply system shown in FIG. 1 during operation of the powder supply system.

FIG. 3 shows a diagram wherein a vacuum or negative pressure provided by the conveying device 19 which corresponds to a delivery rate of the conveying device 19, a flow velocity induced by the operation of the conveying device 19 and a preferred control curve of the powder doser 8 are plotted in dependence on the time, i.e. the operating time of the powder supply system 1. Further, the diagram of FIG. 3 shows ranges of the fluidic resistance of the circuit line 7 and the components arranged therein which is to be overcome when a gas/raw material powder mixture stream is conveyed through the circuit line 7.

In case a clean gas stream 9 which does not contain any raw material powder 4 is conveyed through the circuit line 7, in the exemplary embodiments of a powder supply system 1 described herein, the conveying device 19 has to be operated so as to provide a reference negative pressure of 30% of its maximum negative pressure and/or a reference flow velocity of 30% of the maximum flow velocity which can be achieved during operation of the conveying device 16 in order to overcome the fluidic resistance of the circuit line 7 and the components arranged therein. This is indicated by the left bar in the diagram of FIG. 3. The fluidic resistance of the circuit line 7 and the components arranged therein depends on several parameters, for example the diameter and length of tubes of the circuit line 7, the bending angles of the tubes, the porosity of filter 13, etc. The reference negative pressure and/or the reference flow velocity provided by the conveying device 19 may be stored in the control unit 40.

If an actual negative pressure and/or an actual flow velocity which is required for conveying a clean gas stream 9 through the circuit line 7 deviates from the reference negative pressure and/or the reference flow velocity, this indicates a malfunctioning of a component of the powder supply system 1 which leads to a change in the overall fluidic resistance as indicated by the second bar from the left in the diagram of FIG. 3. For example, in case the actual negative pressure and/or the actual flow velocity is lower than the reference negative pressure and/or the reference flow velocity, this may indicate a decrease of the overall fluidic resistance due to a leakage in the circuit line 7 or in a component arranged in the circuit line 7. To the contrary, in case the actual negative pressure and/or the actual flow velocity of the conveying device 19 is higher than the reference negative pressure and/or the reference flow velocity, this may indicate an increase of the overall fluidic resistance due to a beginning clogging of the circuit line 7 or a component arranged in the circuit line 7.

During operation of the powder supply system 1, the negative pressure provided by the conveying device 19 may be preset to, for example, 60% of its maximum negative pressure. Alternatively or additionally thereto, the flow velocity provided by the conveying device 19 may be preset to, for example, 60% of the maximum flow velocity which can be achieved during operation of the conveying device 19. The third bar from the left in the diagram of FIG. 3 indicates the preferred range of the fluidic resistance which results from the dosage of powder 4 into the gas stream 9 which is conveyed through the circuit line 7 by the conveying device 19 providing a negative pressure of 60% of the maximum negative pressure and/or a flow velocity of 60% of the maximum flow velocity.

An increase of the negative pressure to 85% of the maximum negative pressure and/or an increase of the flow velocity to 85% of the maximum flow velocity is possible without clogging of the system. The corresponding range of the fluidic resistance is indicated by the fourth bar from the left in the diagram of FIG. 3. If, however, the negative pressure exceeds 85% of the maximum negative pressure and/or the flow velocity exceeds 85% of the maximum flow velocity, the circuit line 7 and/or at least one of the components of the powder supply system 1 arranged in the circuit line 7 is/are clogged with raw material powder 4. The corresponding range of the fluidic resistance in this situation is represented by the fifth bar from the left in the diagram of FIG. 3.

During normal operation of the powder supply system 1, the control unit 40 controls the conveying device 19 in such a manner that the negative pressure and/or the flow velocity provided by the conveying device 19 is preset and maintained constant. For example, the negative pressure is set to 60% of the maximum negative pressure and/or the flow velocity is set to 60% maximum flow velocity. Consequently, the pressure values and/or the flow velocity values (and hence the volume flow values) measured by the measuring unit 15 and the further measuring units 16, 17, 18 directly depend on the powder load of the gas stream 9 conveyed through the circuit line 7 by means of the conveying device 19. Specifically, the pressure values and/or the flow velocity (volume flow) values measured by the measuring unit 15 and the further measuring units 16, 17, 18 directly depend on the amount of powder which is introduced into the gas stream 9 per time by means of the powder doser 8. The negative pressure values and/or the flow velocity (volume flow) values measured by the measuring unit 15 and the further measuring units 16, 17 and 18 increase in case the powder load in the gas stream 16 increases, whereas the negative pressure values and/or the flow velocity (volume flow) values measured by the measuring unit 15 and the further measuring units 16, 17, 18 decrease in case the powder load in the gas stream decreases.

This allows the control unit 40 to control the powder doser 8 based on the pressure value and/or the flow velocity (volume flow) value measured by the measuring unit 15. Upon controlling the operation of the powder doser 8 the control unit 40, however, may also consider the pressure values and/or the flow velocity (volume flow) values measured by the further measuring units 16, 17, 18, for example in order to compensate for pressure and/or flow velocity (volume flow) variations within the circuit line 7. In particular, the control unit 40 controls the powder doser 8 in accordance with the control curve shown in FIG. 3.

Upon start-up of the powder supply system 1, the control unit 40 controls the powder doser 8 so as to increase the dose of raw material powder 4 introduced into the gas stream 9 flowing through the circuit line 7 until the pressure value and/or the flow velocity (volume flow) value measured by the measuring unit 15 reaches a predetermined threshold. After the pressure value and/or the flow velocity (volume flow) value measured by the measuring unit 15 has reached the predetermined threshold, the control unit 40 controls of the powder doser 8 so as to maintain the dose of raw material 4 introduced into the gas stream 9 flowing through the circuit line 7 constant.

The predetermined threshold of the pressure value measured by the measuring unit 15 and/or the predetermined threshold of the flow velocity (volume flow) value measured by the measuring unit 15 preferably correspond(s) to an optimum mass flow of raw material powder 4 through the circuit line 7. In the control curve of FIG. 3 the optimum mass flow is represented by the steady-state pressure value which is reached after the initial increase of the pressure value and the following inevitable pressure fluctuations which may exceed the predetermined threshold pressure value and/or by the steady-state flow velocity (volume flow) value which is reached after the initial increase of the vol flow velocity (volume flow) value and the following inevitable flow velocity (volume flow)) value fluctuations which may exceed the predetermined threshold flow velocity (volume flow) value.

Thus, the control unit 40 controls the powder doser 8 so as to dose the raw material powder 4 into the gas stream 9 flowing through the circuit line 7 in such a manner that the pressure value measured by the measuring unit 15 is within a predetermined range which in the example control curve of FIG. 3 is represented by the range between the initial pressure value and the predetermined threshold pressure value. Again, it should, however, be noted, that during the pressure fluctuations following the initial pressure increase, the pressure value measured by the measuring unit 15 may exceed the predetermined threshold pressure value.

Alternatively or additionally thereto, the control unit 40 controls the powder doser 8 so as to dose the raw material powder 4 into the gas stream 9 flowing through the circuit line 7 in such a manner that the flow velocity (volume flow) value measured by the measuring unit 15 is within a predetermined range which in the example control curve of FIG. 3 is represented by the range between the initial flow velocity (volume flow) value and the predetermined threshold flow velocity (volume flow) value. Again, it should, however, be noted, that during the flow velocity (volume flow) fluctuations following the initial flow velocity (volume flow) increase, the flow velocity (volume flow) value measured by the measuring unit 15 may exceed the predetermined threshold flow velocity (volume flow) value.

Besides controlling the normal operation of the powder supply system 1, the control unit 40 is also configured to perform a number of diagnostic functions regarding the operability of the components of the powder supply system 1. For example, the control unit 40 may control the powder doser 8 so as to introduce no powder into the gas stream 9 flowing through the circuit line 7 at a first point in time and to store the at least one of the pressure value and the flow velocity (volume flow) value measured by the measuring unit 15 at the first point in time as at least one of a reference pressure value and a reference flow velocity (volume flow) value. The control unit 40 may also control the powder doser 8 so as to introduce no powder into the gas stream 9 flowing through the circuit line 7 at a second point in time later than the first point in time and to store the at least one of the pressure value and the flow velocity (volume flow) value measured by the measuring unit 15 at the second point in time as at least one of a comparison pressure value and a comparison flow velocity (volume flow) value.

Since the reference pressure value and the comparison pressure value both depend on the delivery rate of the conveying device 19, the reference pressure value and the comparison pressure value are measured while the delivery rate of the conveying device 19 is kept constant. Also both the reference flow velocity (volume flow) value and the comparison flow velocity (volume flow) value depend on the delivery rate of the conveying device 19. Therefore, also the reference flow velocity (volume flow) value and the comparison flow velocity (volume flow) are measured while the delivery rate of the conveying device 19 is kept constant.

The control unit 40 may then compare the pressure value measured by the measuring unit 15 at the second point in time, i.e. the comparison pressure value with the reference pressure value. Alternatively or additionally thereto, the control unit 40 may compare the flow velocity (volume flow) value measured by the measuring unit 15 at the second point in time, i.e. the comparison flow velocity (volume flow) value with the reference flow velocity (volume flow) value. In case the comparison results in a low pressure difference and/or a low flow velocity (volume flow) difference, the fluidic resistance of the circuit line 7 and the components arranged therein has not changed much between the first point in time and the second point in time. This indicates proper functioning of the overall system 1. To the contrary, in case the comparison results in a high pressure difference and/or a high flow velocity (volume flow) difference, this may indicate that there is a malfunction within the system 1. For example, components arranged in the circuit line 7, in particular the filter 13 of the filter unit 14, may be clogged or defect at the second point in time, resulting in an increased fluidic resistance.

The control unit 40 is configured to tolerate a certain deviation of the comparison pressure value from the reference pressure value, but outputs a warning signal and/or interrupts the operation of the powder supply system 1 in case a difference between the pressure value measured by the measuring unit 15 at the second point in time and the reference pressure value exceeds a predetermined threshold. Alternatively or additionally thereto, the control unit 40 is configured to tolerate a certain deviation of the comparison flow velocity (volume flow) value from the reference flow velocity (volume flow) value, but outputs a warning signal and/or interrupts the operation of the powder supply system 1 in case a difference between the flow velocity (volume flow) value measured by the measuring unit 15 at the second point in time and the reference flow velocity (volume flow) value exceeds a predetermined threshold. The control unit 40 may also associate different pressure differences and/or different flow velocity (volume flow) differences with different events and output corresponding information to a user.

Further, the control unit 40 may control the powder doser 8 so as to introduce no powder into the gas stream 9 flowing through the circuit line 7 at one or more third point(s) in time later than the second point in time and to store the pressure value(s) measured by the measuring unit 15 at the third point(s) in time as at least one further comparison pressure value. Alternatively or additionally thereto, the control unit 40 is store the flow velocity (volume flow) value(s) measured by the measuring unit 15 at the third point(s) in time as at least one further comparison flow velocity (volume flow) value.

The control unit 40 may use the at least one further comparison pressure value and/or the at least one further comparison flow velocity (volume flow) value for tracking the time-dependent development of the pressure value and/or the flow velocity (volume flow) value measured by the measuring unit 15 without raw material powder 4 being supplied into the gas stream 9 flowing through the circuit line 7 and hence the fluidic resistance of the circuit line 7 and the components arranged therein. Further, the control unit 40 may adjust the predetermined range and/or the predetermined threshold of the pressure value and/or the flow velocity (volume flow) value measured by the measuring unit 15 in dependence on the actual fluidic resistance of the circuit line 7 and the components arranged therein in order to maintain the desired supply of raw material powder 4 into the process chamber 11 of the apparatus 100 for producing a three-dimensional work piece constant.

The control unit 40 may also compare the further pressure values measured by the further measuring units 16, 17, 18 with the pressure value measured by the measuring unit 15 and/or with each other. Alternatively or additionally thereto, the control unit 40 may also compare the further flow velocity (volume flow) values measured by the further measuring units 16, 17, 18 with the flow velocity (volume flow) value measured by the measuring unit 15 and/or with each other.

Based on this comparison, the control unit 40 may localize a sudden pressure variation and/or a sudden flow velocity (volume flow) variation within the circuit line 7 and thus associate this sudden pressure variation and/or this sudden flow velocity (volume flow) variation to a specific component of the powder supply system 1. For example, a sudden drop between the further pressure value measured by the further measuring unit 16 and the pressure value measured by the measuring unit 15 and/or a sudden drop between the further flow velocity (volume flow) value measured by the further measuring unit 16 and the flow velocity (volume flow) value measured by the measuring unit 15 indicates clogging of the filter 13 of the filter unit 14 and hence may be used as a trigger for cleaning the filter 13. The control unit 40 may output a suitable signal to a user which indicates a location of a malfunctioning component or a component which needs maintenance within the powder supply system 1.

The invention claimed is:

1. Powder supply system, in particular for use in an apparatus for producing a three-dimensional work piece by irradiating layers of a raw material powder with electromagnetic or particle radiation, the powder supply system comprising:
    a circuit line configured to conduct a gas stream;
    a conveying device configured to convey the gas stream through the circuit line;
    a powder doser configured to introduce a desired dose of the raw material powder into the gas stream flowing through the circuit line;
    a measuring unit configured to measure at least one of a pressure and a volume flow in the circuit line at a position downstream of the powder doser;
    at least one further measuring unit configured to measure at least one of the pressure and the volume flow in the circuit line at at least one further position; and
    a control unit configured to control the powder doser based on at least one of a pressure value and a volume flow value measured by the measuring unit in such a manner that the at least one of the pressure value and the volume flow value measured by the measuring unit is within a predetermined range,
    wherein the control unit further is configured:
    to control the powder doser based on at least one further pressure and/or volume flow value measured by the at least one further measuring unit, and/or
    to compare a plurality of further pressure and/or volume flow values measured by a plurality of further measuring units with each other.

2. The powder supply system of claim 1, further comprising a cyclone configured to separate the raw material powder introduced into the gas stream by the powder doser from the gas stream and to supply the raw material powder to a process chamber of the apparatus, wherein the measuring unit in particular is configured to measure the at least one of the pressure and the volume flow in the circuit line at a position downstream of the cyclone.

3. The powder supply system of claim 1, wherein the control unit is configured to control the powder doser so as to increase the dose of the raw material powder introduced into the gas stream flowing through the circuit line until the at least one of the pressure value and the volume flow value measured by the measuring unit reaches a predetermined threshold.

4. The powder supply system of claim 3, wherein the control unit is configured to control the powder doser so as to dose the raw material powder introduced into the gas stream flowing through the circuit line in such a manner that, after reaching the predetermined threshold, the at least one of the pressure value and the volume flow value measured by the measuring unit is/are maintained substantially constant.

5. The powder supply system of claim 1, wherein the control unit is configured
- to control the powder doser so as to introduce no powder into the gas stream flowing through the circuit line at a first point in time,
- to store the at least one of the pressure value and the volume flow value measured by the measuring unit at the first point in time as at least one of a reference pressure value and a reference volume flow value,
- to control the powder doser so as to introduce no powder into the gas stream flowing through the circuit line at a second point in time later than the first point in time, and
- to compare the at least one of the pressure value and the volume flow value measured by the measuring unit at the second point in time with a corresponding one of the at least one of the reference pressure value and the reference volume flow value.

6. The powder supply system of claim 5, wherein the control unit is configured to output a warning signal in case a difference between the at least one of the pressure value and the volume flow value measured by the measuring unit at the second point in time and the corresponding one of the at least one of the reference pressure value and the reference volume flow value exceeds a predetermined threshold.

7. The powder supply system of claim 1, wherein the conveying device is designed in the form of a vacuum pump and/or is connected to the circuit line at a position upstream of the powder doser and/or downstream of the measuring unit.

8. The powder supply system of claim 2, further comprising a filter unit configured to filter raw material powder particles from the gas stream flowing through the circuit line, wherein the filter unit in particular is connected to the circuit line upstream of the measuring unit and/or downstream of the cyclone.

9. The powder supply system of claim 8, wherein the at least one further measuring unit is configured to measure at least one of the pressure and the volume flow in the circuit line, in particular at a position upstream of the filter unit, upstream of the cyclone and/or upstream of the powder doser.

10. The powder supply system of claim 9, wherein the control unit is configured:
- to compare the at least one further pressure value measured by the at least one further measuring unit with the pressure value measured by the measuring unit and/or to compare the at least one further volume flow value measured by the at least one further measuring unit with the volume flow value measured by the measuring unit, and/or
- to indicate a location of a malfunctioning component of the powder supply system based on the comparison of the at least one further pressure value measured by the at least one further measuring unit with the pressure value measured by the measuring unit and/or based on the comparison of the at least one further volume flow value measured by the at least one further measuring unit with the volume flow value measured by the measuring unit.

11. The powder supply system of claim 1,
wherein the measuring unit comprises at least one of a pressure sensor and a flow velocity sensor, and/or
wherein the at least one further measuring unit comprises at least one of a pressure sensor and a flow velocity sensor.

12. A method of operating a powder supply system for use in an apparatus for producing a three-dimensional work piece by irradiating layers of a raw material powder with electromagnetic or particle radiation, the method comprising:
conveying a gas stream through a circuit line;
introducing a desired dose of the raw material powder into the gas stream flowing through the circuit line by means of a powder doser;
measuring at least one of a pressure and a volume flow in the circuit line at a position downstream of the powder doser by means of a measuring unit;
measuring at least one of the pressure and the volume flow in the circuit line at at least one further position by means of at least one further measuring unit; and
controlling the dose of the raw material powder introduced into the gas stream flowing through the circuit line by means of the powder doser based on at least one of a pressure value and a volume flow value measured by the measuring unit in such a manner that the at least one of the pressure value and the volume flow value measured by the measuring unit is within a predetermined range,
wherein the method further comprises:
controlling the dose of raw material powder introduced into the gas stream flowing through the circuit line by means of the powder doser based on at least one further pressure and/or volume flow value measured by the at least one further measuring unit, and/or
comparing a plurality of further pressure and/or volume flow values measured by a plurality of further measuring units with each other.

13. The method of claim 12, wherein
the raw material powder introduced into the gas stream by the powder doser is separated from the gas stream and supplied to a process chamber of the apparatus by means of a cyclone; and/or
the dose of the raw material powder introduced into the gas stream flowing through the circuit line is increased until the at least one of the pressure value and the volume flow value measured by the measuring unit reaches a predetermined threshold; and/or
the dose of the raw material powder introduced into the gas stream flowing through the circuit line is maintained constant after the at least one of the pressure value and the volume flow value measured by the measuring unit has reached the predetermined threshold.

14. The method of claim 12, wherein the step of controlling the dose of the raw material powder introduced into the gas stream flowing through the circuit line comprises:
introducing no powder into the gas stream flowing through the circuit line at a first point in time;
storing the at least one of the pressure value and the volume flow value measured by the measuring unit at the first point in time as at least one of a reference pressure value and a reference volume flow value;
introducing no powder into the gas stream flowing through the circuit line at a second point in time later than the first point in time; and
comparing the at least one of the pressure value and the volume flow value measured by the measuring unit at the second point in time with the corresponding one of the at least one of the reference pressure value and the reference volume flow value; and optionally
outputting a warning signal in case a difference between the at least one of the pressure value and the volume flow value measured by the measuring unit at the second point in time and the corresponding one of the at least one of the reference pressure value and the reference volume flow value exceeds a predetermined threshold.

15. The method of claim 12, wherein the at least one of the pressure and the volume flow in the circuit line is measured by means of at least one further measuring unit, in particular at a position upstream of the filter unit, upstream of the cyclone and/or upstream of the powder doser.

16. The method of claim 15, further comprising
comparing the at least one further pressure value measured by the at least one further measuring unit with the pressure value measured by the measuring unit, and/or
indicating a location of a malfunctioning component of the powder supply system based on the comparison of the at least one further pressure value measured by the at least one further measuring unit with the pressure value measured by the measuring unit.

17. The method of claim 15, further comprising
comparing the at least one further volume flow value measured by the at least one further measuring unit with the volume flow value measured by the measuring unit, and/or
indicating a location of a malfunctioning component of the powder supply system based on the comparison of the at least one further volume flow value measured by the at least one further measuring unit with the volume flow value measured by the measuring unit.

18. Apparatus for producing a three-dimensional work piece by irradiating layers of a raw material powder with electromagnetic or particle radiation, the apparatus comprising a powder supply system, the powder supply system comprising:
a circuit line configured to conduct a gas stream;
a conveying device configured to convey the gas stream through the circuit line;
a powder doser configured to introduce a desired dose of the raw material powder into the gas stream flowing through the circuit line;
a measuring unit configured to measure at least one of a pressure and a volume flow in the circuit line at a position downstream of the powder doser;
at least one further measuring unit configured to measure at least one of the pressure and the volume flow in the circuit line at at least one further position; and
a control unit configured to control the powder doser based on at least one of a pressure value and a volume flow value measured by the measuring unit in such a manner that the at least one of the pressure value and the volume flow value measured by the measuring unit is within a predetermined range,
wherein the control unit further is configured:
to control the powder doser based on at least one further pressure and/or volume flow value measured by the at least one further measuring unit, and/or
to compare a plurality of further pressure and/or volume flow values measured by a plurality of further measuring units with each other.

* * * * *